Dec. 9, 1941.　　　C. W. KIBBEY　　　2,265,434
HEARSE
Filed June 18, 1940　　　2 Sheets-Sheet 1

INVENTOR.
CARL W. KIBBEY
BY
Rollander, McGrew & Campbell
ATTORNEYS.

Dec. 9, 1941.  C. W. KIBBEY  2,265,434
HEARSE
Filed June 18, 1940  2 Sheets-Sheet 2

INVENTOR.
CARL W. KIBBEY
BY Rollandet, McGrew & Campbell
ATTORNEYS.

Patented Dec. 9, 1941

2,265,434

UNITED STATES PATENT OFFICE 2,265,434

HEARSE

Carl W. Kibbey, Loveland, Colo.

Application June 18, 1940, Serial No. 341,112

1 Claim. (Cl. 296—16)

This invention relates to improved construction in a combination ambulance and hearse. This inventive concept can be used to convert a passenger automobile into a combination ambulance and hearse, and it also can be used in the original manufacturing design and construction of such a vehicle.

A principal object of the invention is to provide a combination ambulance and hearse that is accessible for loading and unloading, both from the rear and also from the side, in an unusually efficient manner.

Another object is to provide such a vehicle that is relatively low in cost.

Other objects and advantages reside in details of design and construction which will be more fully disclosed in the following description and in the drawings wherein like parts have been similarly designated and in which.

In order to disclose an operative reduction to practice of the present invention, the accompanying drawings will be described in detail. However, these illustrations are merely intended to be a typical example and should not be considered as expressing or implying any limitation to the present inventive concept, the scope of which is, in reality, measured by the appended claim.

There is considerable need for a low-priced combination ambulance and hearse that may be opened for loading and unloading either at the rear or at the side, and such a vehicle readily can be made from a so-called seven-passenger automobile, as will be hereinafter fully explained.

Figure 1:
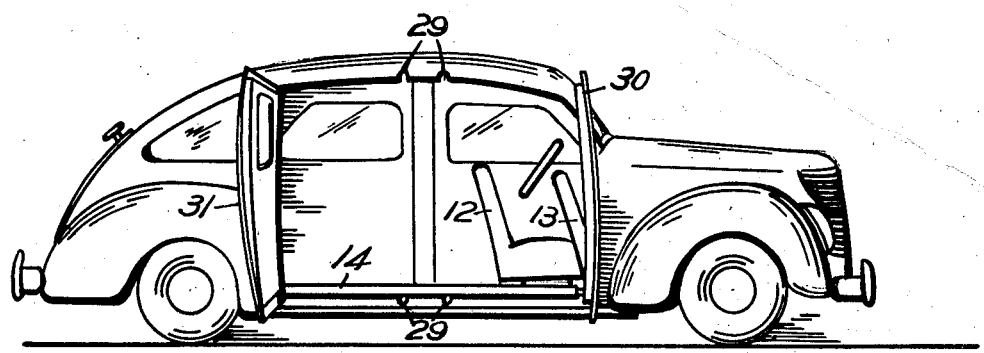
Figure 1 is a general side elevation of a vehicle that embodies the present inventive concept.
Figure 2:
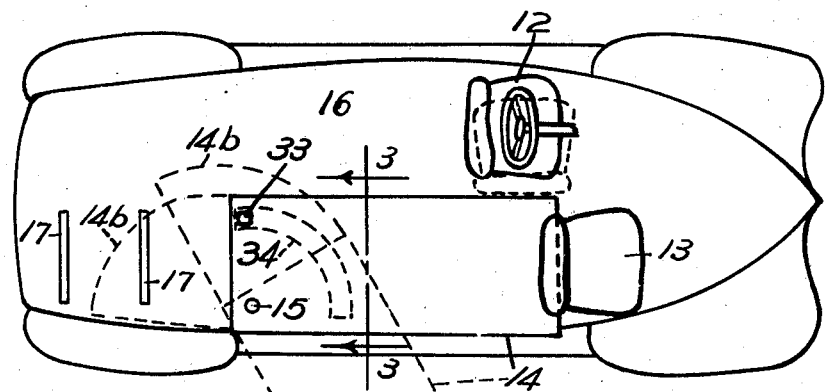
Figure 2 is a diagrammatic plan view of the vehicle shown in Figure 1.
Figure 3:
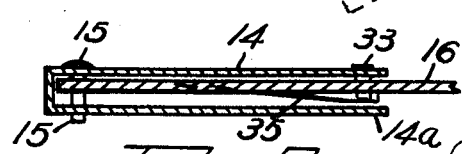
Figure 3 is a fragmentary sectional view taken along the line 3—3 of Figure 2, and drawn on a larger scale.

Referring first to Figures 1, 2 and 3, the column on the right side of the vehicle, against which the doors ordinarily latch, is removed, together with some of the seats, and only a driver's seat 12 and another front seat 13 need be retained. In order to provide clearance, the driver's seat 12 may be mounted for both sliding and pivotal movement, as illustrated, and the other front seat 13 is mounted for forward and back sliding movement.

A pivotal table or platform 14 is pivotally mounted as at 15 in a position to swing outwardly, as illustrated in dotted lines, Figure 2, through the side opening provided in the car by removal of the column on the right side of the car body.

The general cross sectional shape of this platform 14 is well shown in Figure 3 and it includes a lower portion 14a which extends rearwardly as at 14b, beyond the top portion. The lower portion 14a and its rearward extension 14b are positioned below the ordinary floor 16 of the vehicle and the rearward extension 14b provides a stabilizing factor so that the entire platform may be swung outwardly from the car as a cantilever, for loading or unloading.

Figure 4:
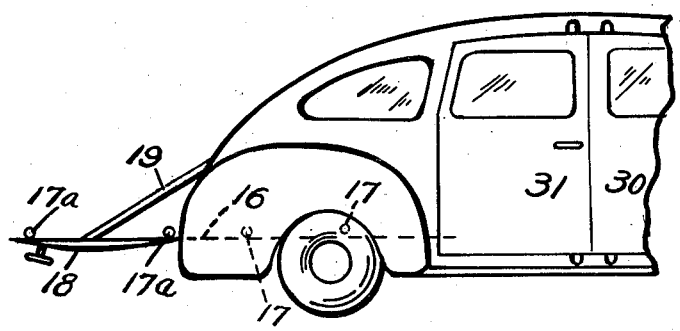
Figure 4 is a fragmentary elevation of a vehicle similar to that shown in Figures 1 and 2, showing the rear entrance in an open position.

A plurality of rollers 17 may be provided on the floor of the car to the rear of the platform 14 to facilitate loading or unloading through the rear which opens as illustrated in Figure 4. The rear closure door 18 may also be provided with additional rollers 17a at suitable locations. The rear closure 18 opens downwardly and is held on a level with the floor 16 by means of straps or braces 19 at either side thereof.

Figure 5:
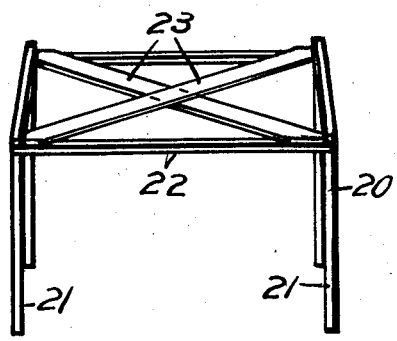
Figure 5 is a perspective view of a reinforcing structural element that may be incorporated in a passenger automobile to support its body structure when it is converted into a combination ambulance and hearse according to this invention.
Figure 6:
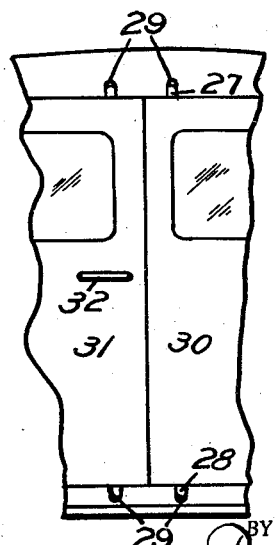
Figure 6 is a fragmentary view illustrating the side doors of Figure 1 as they would appear in a closed position and drawn on a larger scale.

In order to strengthen the body, and particularly to compensate for the removal of the column at the center of the right side, a structural assembly 20, Figure 5, preferably made of steel, channel and angle members may be installed in the body. The vertical members 21 are spaced to be positioned at either side of the side opening and the upper member 22 is to be positioned across the top of said opening to support the top of the car body. The crossed members 23 are positioned within the car body adjacent the top thereof and the left side of this structural assembly is similar to the right side.

Figure 7:
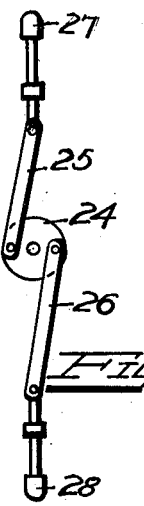
Figure 7 illustrates door-latching mechanism that may be used on the side entrance doors illustrated in Figures 1, 4 and 6.

In order to provide a further stabilizing factor for the car body and for the doors on the side thereof, latching mechanisms as shown in Figure 7, may be installed on the inside of each door on the side of the car. This latching mechanism comprises a disc member 24 that is rotatable only from within the car to move connecting links 25 and 26 which in turn move rubber padded latch members 27 and 28 to engage in suitable sockets 29 that are to be provided in the car body and suitably located to receive the latching members.

It is preferred to have the front door 30 overlap the rear door 31, and the latching element of Figure 7 may be used on only the front door 30, or on both doors 30 and 31, as preferred. A "dummy" handle 32 may be provided on one of the doors, if desired, but the rear side doors can be opened only from the inside, thus to prevent unauthorized opening of the doors or tampering therewith. The rubber latch members 27 and 28 are coordinated with the receiving sockets 29 so that a friction fit is effected, thus preventing rattling of the doors and helping to stabilize the entire car body assembly.

It is manifest that a stretcher or a casket can be loaded into this vehicle, either through the rear or through the side. The movable seats 12 and 13 can be moved to clear the swinging pivotal platform 14, which platform is particularly easy of access either for loading or unloading, due to its pivotal mounting. A special feature of the platform 14 is a pin 33 which engages in an arcuate groove 34 that has an inclined bottom 35.

When the swinging platform 14 is moved about its pivotal mounting 15, the pin 33 is forced upwardly as it travels along the upwardly inclined bottom 35 of the groove 34, thus to provide stop means to hold anything that is loaded on the platform from accidental movement relative thereto. When the vehicle is to be used as an ambulance, it may be desirable to cover the rollers with a padded carpet.

As hereinbefore pointed out, the same structural features herein illustrated and described may well be incorporated in the original design and construction of such a vehicle and the invention applies equally to the conversion of a passenger automobile or to original construction.

It is manifest that when the swinging platform 14 is positioned so that it extends laterally from the car body, as illustrated in Figure 2, a casket readily can be placed thereon or removed therefrom, thus greatly to facilitate side loading or unloading. If circumstances are such that rear loading or unloading is preferred, then the rear closure 18 facilitates such use of the vehicle since it is provided with rollers and held on a level with the general floor-line of the vehicle.

The example herein illustrated and described discloses the vehicle opening at the right side. However, it is manifest that the same mechanism and procedure could be used on the left side or at both sides. The invention is not limited to either side, but is equally effective on both sides. Furthermore, the procedure herein described refers particularly to the conversion of a regular seven-passenger automobile, but under some circumstances, the manufacturer might furnish such a vehicle in a semi-finished or "roughed out" stage of completion and the work then completed and upholstered, with the desired seating arrangement, according to the requirements or preference of the user.

What I claim and desire to secure by Letters Patent is:

In a vehicle of the character disclosed inclusive of a car body having a side opening, the improvement which comprises a platform pivotally mounted on the vehicle at the opening in a position to swing outwardly through said opening, a pin carried on said platform and movable with reference thereto, a relatively stationary arcuate groove having an inclined bottom positioned for engagement by said pin whereby it is elevated when the platform is swung about its pivotal mounting.

CARL W. KIBBEY.